Patented Nov. 9, 1926.

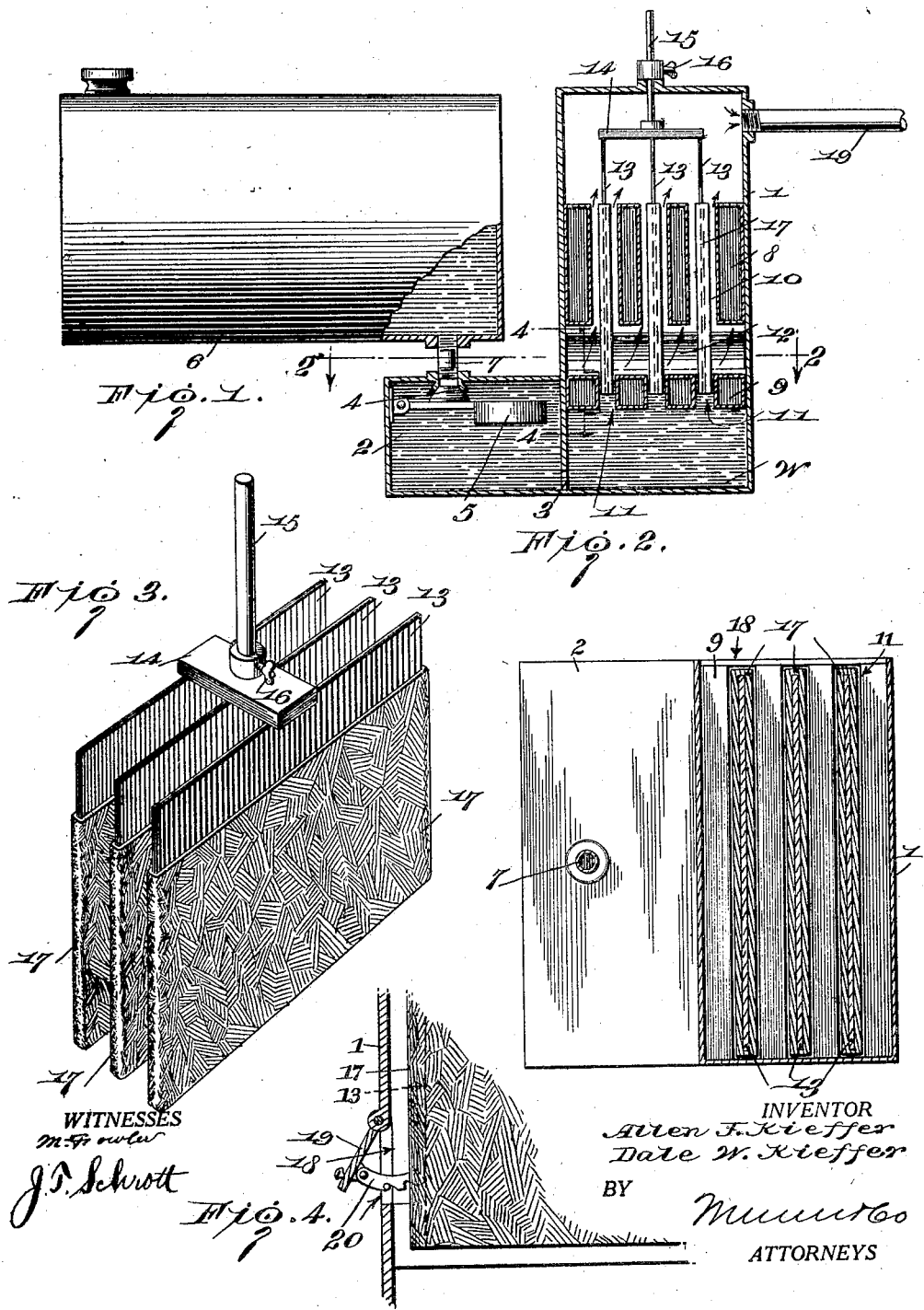

1,606,472

UNITED STATES PATENT OFFICE.

ALLEN JEROME KIEFFER, OF HOT SPRINGS, SOUTH DAKOTA, AND DALE WILLIAM KIEFFER, OF CLEVELAND, OHIO.

AIR MOISTENER FOR INTERNAL-COMBUSTION ENGINES.

Application filed February 1, 1924. Serial No. 689,948.

Our invention relates to improvements in air moisteners and it consists of the constructions, combinations and arrangements herein described and claimed.

An object of the invention is to provide an air moistener adapted particularly for use in connection with internal combustion engines, and operating on such a principle that air may either be carburetted or moistened depending on whether water or motor fuel is used, use being made however of different apparatuses for the separate purposes.

Another object of the invention is to provide a moistener of such nature that the moisture laden air after having passed through will contain but a very small amount of foreign matter such as dust, the result being a more efficient operation of the engine which the moistener supplies.

Other objects and advantages will appear from the following specification, reference being had to the accompanying drawing, in which, Figure 1 is a sectional view of the improved moistener showing how a constant supply of liquid is maintained.

Figure 2 is a detail section on the line 2—2 of Figure 1.

Figure 3 is a detail perspective of the capillary plates.

Figure 4 is a detail section on the line 4—4 of Figure 1 showing the door through which air is admitted.

Figure 1 conveys a good idea of the construction and purpose of the invention. The moistener is intended to be interposed between the air intake of a carburetor (not shown) and the outer atmosphere. According to this particular adaptation of the invention the moistener contains water. Another purpose of the invention is to volatilize motor fuel so that a pure vapor or gas, free from any unvolatilized particles, dust, et cetera, may be formed to be supplied to the combustion chamber of an engine.

In either case the construction of the moistener is the same. The moistener is composed of a rectangular or other suitably shaped casing 1 which, according to the first mentioned adaptation of the invention contains water W at the bottom. This water is supplied by the float chamber 2 which communicates with the casing through an opening 3 in the dividing partition.

A valve 4 which is carried by the pivoted float 5 keeps the chamber 2 supplied with water from the reservoir 6. The reservoir communicates with the chamber through a pipe 7. Upon lowering of the water level the float 5 will follow and open the valve 4 so that more water enters the chamber 2.

Arranged in the casing 1 are sets of spacers 8 and 9. These are shown as of hollow rectangular formation but obviously they may be made of other shapes and still perform the intended purpose. The respective sets of spacers define passages 10 and 11. The uppermost set of spacers define air passages in the casing 1. The lower set define water passages in the water compartment of the casing and function as guides. The lower spacers also act to keep the water from splashing out when used on motor vehicles.

The sets of spacers are separated in the vertical direction so as to leave what might be called a chamber 12. A plurality of plates 13 hang in the casing 1, being suspended from a bar 14 which in turn is carried by a rod 15. The rod passes outside of the casing 1, where it is adjustably held at 16 so that the plates 13 may be raised and lowered. The bar 14 provides the common connector by which the plates are held in a definite spaced relation.

Applied to the lower part of each plate 13 is a covering 17 of absorbent material. This covering may consist of cotton, wool, silk, jute, sponge, fabric, felt, or any other materials that have the property of capillary attraction. The plates 13 are adjusted low enough in the casing 1 so that the ends dip into the water W at the spaces 11. The covering 17 soaks up the water, and as air entering at the opening 18 (Figures 2 and 4) passes upward in the passages 10 moisture is gathered thereby to be carried to the intake of the carburetor which the reader may suppose to be connected with the pipe 19.

It is desirable that the plates 13 shall occupy the substantial center of the passages 10, and to this end the spacers 9 may act as guides or retainers should there be any tendency of the plates to deviate.

The variation of the moisture content of the air may be regulated by the adjustable feature of the plates 13. By adjusting the plates lower less of the covering 17 will be exposed above the water to the action of air and consequently a reduction of the moisture content will follow. It is to be observed that the air enters the casing almost on a line with the level of the water W and nearly at the base of the plates. The moist coverings 17 are therefore completely subjected to the action of the air. The reader can readily see that where the plates are adjusted far enough down so that the lower ends nearly touch the bottom of the casing 1, the moist surfaces of the coverings 17 would be reduced nearly one-half. Presuming the quantity of the entering air to be the same the amount of moisture taken up thereby would also be reduced approximately one-half.

The opening 18 is situated at such side of the casing 1 that the entering air strikes the plates from the edges. The air is immediately separated into several streams which pass upward in the passages 10 and therefore must contact with the moist coverings 17 due to the restriction of these passages by the presence of the plates. The opening 18 is adjustable as to size by moving the door or covering 19 up and down. This door may have a suitably made support 20 by which the adjustments are maintained.

Mention has been made of the use of the invention as a vaporizer of liquids other than water. The liquid W may be gasoline, kerosene, alcohol, or any other volatile motor fuel. The action of the air on such liquids will be the same as on water. When employed to volatilize such liquids the apparatus becomes a carbureter at which time it is connected directly to the intake manifold.

The advantages of this device for vaporizing motor fuels are that a pure vapor or gas free from any unvaporized particles or drops of liquid will be delivered to the combustion chamber, and that such particles will to a large extent cling to the moist surfaces of the plates suspended in the casing rather than enter the combustion chamber. The plates may be cleaned from time to time as the dust and dirt particles collect upon them. As a consequence of the use of this device the motor will operate more efficiently.

Scoring of the cylinder walls will be prevented by the checking of the entrance of dust. The use of the device for vaporizing water may be separate or in conjunction with another device of the same kind for vaporizing motor fuel.

While the construction and arrangement of the improved moistener as herein described and claimed is that of a generally preferred form, obviously modifications and changes may be made without departing from the spirit of the invention or the scope of the claims.

We claim:

1. A device of the character described comprising a casing having an air inlet and outlet, a pair of sets of spacers of which one set is disposed between the air inlet and outlet and the other set is disposed below the air inlet, the lower set of spacers keeping water contained by the casing from splashing out of the air inlet, and an absorbent element suspended in the casing between both sets of spacers and extending past the air inlet, said first mentioned set of spacers insuring contact of the air with said element.

2. An air moistener comprising a casing having an air opening and containing liquid, two sets of spacers in the casing in vertical spaced relationship to produce a chamber with which said opening communicates said spacers respectively defining air passages above the liquid, and liquid spaces below the level of said liquid, a plurality of absorbent members occupying the air passages, extending across said chamber and dipping into the liquid in said liquid spaces, said members constricting the passages between the uppermost spacers so that air is forced to contact with the surfaces of said absorbent members, and means for conveying the resulting vapor from the casing.

3. An air moistener comprising a casing having an air opening and containing liquid, a set of spacers fixed in the casing and immersed in the liquid, a second set of spacers also fixed in the casing but in spaced relationship to the first set to define a chamber, said various spacers defining passages in the casing, and a plurality of plates adjustably pendant in said passages and chambers and having absorbent members dipping into the liquid between the first set of spacers, said members constricting the passages between the uppermost spacers so that air is forced to contact with the surfaces of said absorbent members.

4. An air moistener comprising a casing having an air opening at one end and containing liquid, two sets of spacers separated vertically to define an air chamber in the casing in the region of said opening, one set of spacers being situated in the liquid, the other defining air passages situated transversely to said opening, a plurality of plates having absorbant coverings thereupon, said plates occupying the various passages between the spacers, the air entering at said opening edgewise of the plates, a bar from which the plates are suspended and by which they are spaced, a rod extending upward from the bar, and means to adjustably hold the rod.

ALLEN JEROME KIEFFER.
DALE WILLIAM KIEFFER.